US007698253B2

(12) United States Patent
Hrle

(10) Patent No.: US 7,698,253 B2
(45) Date of Patent: *Apr. 13, 2010

(54) METHOD AND SYSTEM FOR REDUCING HOST VARIABLE IMPACT ON ACCESS PATH SELECTION

(75) Inventor: Namik Hrle, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 321 days.

This patent is subject to a terminal disclaimer.

(21) Appl. No.: 11/777,049

(22) Filed: Jul. 12, 2007

(65) Prior Publication Data

US 2007/0294218 A1 Dec. 20, 2007

Related U.S. Application Data

(63) Continuation of application No. 10/688,951, filed on Oct. 21, 2003, now Pat. No. 7,275,051.

(30) Foreign Application Priority Data

Nov. 8, 2002 (EP) .................................. 02102550

(51) Int. Cl.
*G06F 17/30* (2006.01)
(52) U.S. Cl. ........................ 707/2; 707/1; 707/3; 707/4; 707/5; 707/100
(58) Field of Classification Search ................. 707/1–5, 707/100–104.1
See application file for complete search history.

(56) References Cited

U.S. PATENT DOCUMENTS 4,956,774 A     9/1990   Shibamiya et al.
5,091,852 A     2/1992   Tsuchida et al.
5,948,108 A     9/1999   Lu et al.
6,006,220 A    12/1999   Haderle et al.
6,219,660 B1    4/2001   Haderle et al.
6,556,988 B2    4/2003   Tsuchida et al.
6,738,782 B2 *  5/2004   Agarwal et al. ............. 707/102
6,990,484 B1 *  1/2006   Ghazal et al. .................. 707/3
7,275,051 B2    9/2007   Hrle
2001/0014888 A1* 8/2001  Tsuchida et al. ............... 707/2

OTHER PUBLICATIONS

Klug, "Access Paths in the "Abe" Statistical Query Facility," 1982, ACM, pp. 161-173.
Graefe, G., et al. "Dynamic Query Evaluation Plans", Proc. ACM-SIGMOD, 1989, pp. 358-366.
Non-Final Office Action dated May 18, 2006 from parent U.S. Appl. No. 10/688,951.
Final Office Action dated Oct. 3, 2006 from parent U.S. Appl. No. 10/688,951.
Non-Final Office Action dated Feb. 9, 2007 from parent U.S. Appl. No. 10/688,951.

* cited by examiner

*Primary Examiner*—Cam-Linh Nguyen
(74) *Attorney, Agent, or Firm*—Elissa Wang; SVL; IP Law

(57) ABSTRACT

The present invention proposes enhancing the access path selection process by storing the relevant frequency distribution and the host variables values used for selecting the access path together with the corresponding access path executable. This way, the host variables impact to the access path can be inexpensively assessed and the re-optimization triggered only if necessary.

30 Claims, 3 Drawing Sheets

_US 7,698,253 B2_

METHOD AND SYSTEM FOR REDUCING HOST VARIABLE IMPACT ON ACCESS PATH SELECTION

CROSS-REFERENCE TO RELATED APPLICATIONS

This application is a continuation of U.S. patent application Ser. No. 10/688,951, entitled "Method and System for Reducing Host Variable Impact on Access Path Selection" and filed Oct. 21, 2003, now U.S. Pat. No. 7,275,051, the disclosure of which is incorporated herein by reference in its entirety.

BACKGROUND OF THE INVENTION

1. Field of the Invention

This invention relates in general to computer-implemented database systems, and, in particular, to improving an access path selection for Structured Query Language with variables in a relational database management system.

2. Description of the Related Art

Databases are computerized information storage and retrieval systems. A Relational Database Management System (RDBMS) is a database management system (DBMS) which uses relational techniques for storing and retrieving data. Relational databases are organized into tables, which consist of rows and columns of data. The rows are formally called tuples. A database will typically have many tables and each table will typically have multiple tuples and multiple columns. The tables are typically stored on random access storage devices (RASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

The definitions for SQL provide that a RDBMS should respond to a particular query with a particular set of data given a specified database content, but the method that the RDBMS uses to actually find the required information in the tables on the disk drives is left up to the RDBMS. Typically, there will be more than one method that can be used by the RDBMS to access the required data. The RDBMS will optimize the method used to find the data requested in a query in order to minimize the computer time used and, therefore, the cost of performing the query.

The RDBMS software determines an access path for an SQL statement during a bind process. SQL compilation is called a BIND process, and the output of the BIND process is a plan, which is a compiled run-time structure used for executing the SQL statement. The plan includes access paths, which are the paths the RDBMS uses to get to the data that SQL statements request. During the BIND process, an optimizer of the RDBMS software selects an access path for a SQL statement. The access path is the key to determining how well an SQL statement performs.

Most RDBMS such as DB2, Informix, Oracle and MS SQL Server implement so called cost-based optimizer. The optimizer is a component that, based on the application request specified in form of SQL statement, selects, i.e., generates an optimal access path to the requested data. The access path details are stored in a form of an executable code either on disk (for static SQL) or in the processors cache (for dynamic SQL). This code is referenced during subsequent statement executions. This way the RDBMS saves significant processor resources because, in general, the optimization process is many times (for a typical Online Transaction Processing (OLTP) workload, hundreds of times) more expensive that the statements execution itself.

In order to select the optimal access path, the cost-based optimizers (unlike rule-based ones) take into account the current status of some environmental variables. The most important of these variables is the statistics such as cardinality, size and frequency distribution of the database objects that need to be accessed. While the cardinality (the number of distinct values a database object has) and its size can always be available to the optimizer, the frequency distributions of table columns' values are often unknown. The reason is that the so-called host variables regularly change with each statements execution.

U.S. Pat. No. 6,006,220 by Donald J. Haderle et al., assigned to IBM Corporation, Armonk, N.Y., US, filed Sep. 30, 1997, issued Dec. 21, 1999, "Determining the optimal access path for a query at execution time using an actual value for each variable in a query for estimating a filter factor" states that, currently, when an SQL statement includes a variable, the default filter factor, also known as selectivity, selected for the SQL statement is typically not optimal, and, therefore, the access path that is determined is not necessarily optimal. Therefore, a method is suggested of executing a query in a computer, the query being performed by the computer to retrieve data from a database stored on a data storage device connected to the computer, the method comprising the step of: determining an optimal access path for the query at execution time using an actual value for each variable in the query to estimate a filter factor, wherein each variable is a special register.

OBJECT OF THE INVENTION

Starting from this, the object of the present invention is to provide a method and a system that facilitates a more efficient execution of database queries containing variables.

BRIEF SUMMARY OF THE INVENTION

According to the present invention, a method and a system are provided for processing a query in a database management system. Firstly, a preferred access path is generated for a query at execution time on the basis of a first value for each variable in the query. The information about the query, about the first value for each variable and about the preferred access path is stored. In case the same query is to be executed again using a second value for each variable, the information about the first value for each variable is compared with information about the second value for the respective variable and it is determined whether or not a re-generation of the preferred access path is to be performed again, and, in the affirmative, a re-generation of the preferred access path is initiated.

The step of re-generating the preferred access path may include the step of storing the newly generated preferred access path, the associated host variables and frequency distributions. In other words, when a re-optimization is needed, the new access path would not overwrite the old one, but just be added to a list of possible access paths.

Hence, the present invention proposes enhancing the access path selection process by storing the relevant frequency distribution and the host variables values used for selecting the access path together with the corresponding access path executable. This way the host variables impact to the access path can be inexpensively assessed and the re-optimization triggered only if necessary.

Let's demonstrate the idea in an example.

Let T(C1, C2, C3) be a table with columns C1, C2 and C3, and an index (C1, C2).

card(T)=1000.

card(C1)=3. The values are 'A', 'B' and 'C'.

card('A')=500, card('B')=490, card('C')=10, where "card" refers to the cardinality.

The following code segment needs to be executed:

hv=value for C1 specified as a host variable (e.g. user input via some data entry facility) SELECT*FROM T WHERE C1=hv Assume that the values assigned to hv are 'B', 'A', 'D'. The access path selection process, i.e., the optimization, is delayed to statement execution time. For the first statement execution, the optimizer will generate a tablespace scan access path (because cardinality of 'B' is very high) and store it for subsequent executions. Along with this code, the frequency distribution for C1 and value 'B' will be stored. When the statement is executed for the second time, a quick check will reveal that the value of 'A' does not change the access path (because the cardinality of 'A' is close to the cardinality of 'B'), therefore the existing executable can be used without re-optimization. At the third execution, the "hv" value is 'D' and the check will signal that the re-optimization needs to be done (because cardinality of 'D' is 0, i.e., very different from its predecessors).

This methodology ensures that the statements are always executed with the optimal access characteristics, but without costly re-optimizations that are currently associated with every statement execution.

The most efficient implementation of the idea includes storing all the different access paths and their associated host variables values and frequency distributions as they get generated. In other words, when a re-optimization is needed, the new access path would not overwrite the old one, but just be added to the list of possible access paths.

BRIEF DESCRIPTION OF THE SEVERAL VIEWS OF THE DRAWINGS

The above, as well as additional objectives, features and advantages of the present invention, will be apparent in the following detailed written description.

The invention itself, however, as well as a preferred mode of use, further objectives, and advantages thereof, will best be understood by reference to the following detailed description of an illustrative embodiment when read in conjunction with the accompanying drawings, wherein.

DETAILED DESCRIPTION OF THE INVENTION

Figure 1:
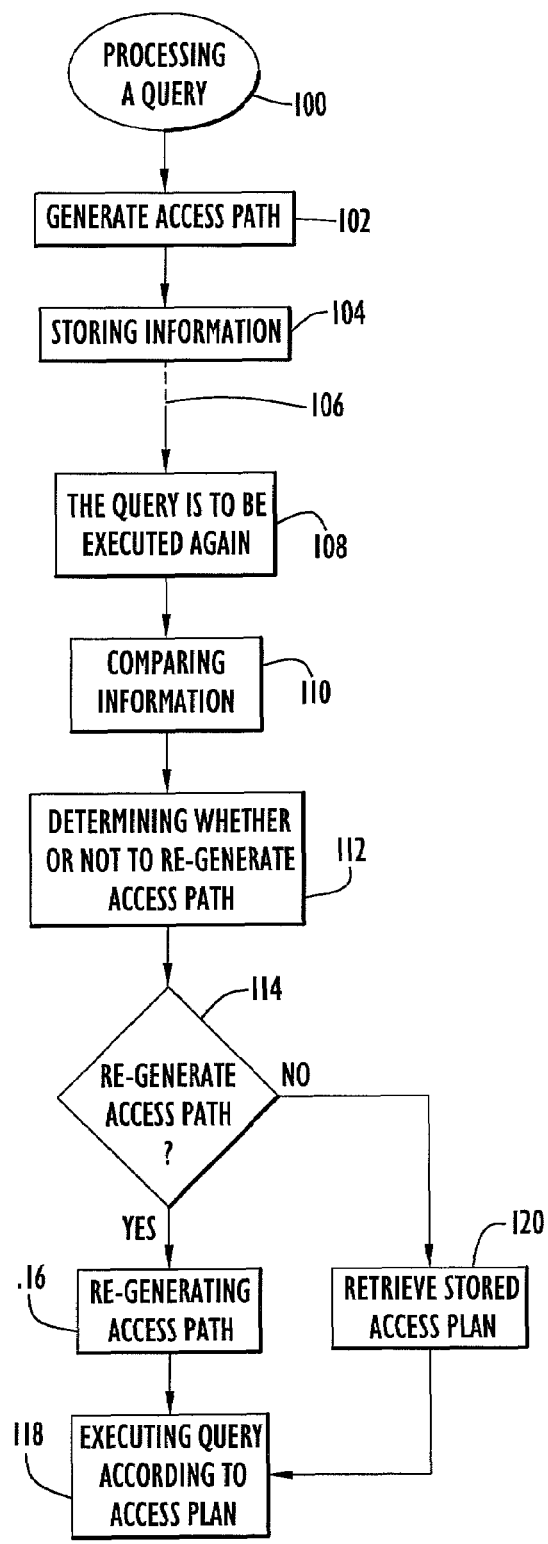
FIG. 1 shows a flowchart of a first embodiment of the method of processing a query in accordance with the present invention.

With reference now to FIG. 1, there is depicted a flowchart of a first embodiment of the method in accordance with the present invention, in particular, FIG. 1 illustrates a method of processing a query in a database management system (block 100).

When a query is to be executed, a preferred access path is generated for said query at execution time on the basis of a first value for each variable in the query. The first value for each variable is, in this moment, the actual value. Therefore, an optimizer performing the task of generating the preferred access path is able to take into account the actual values of the query variables (block 102).

According to the present invention, information about the query, about the first value for each variable and about the preferred access path is stored for future use (block 104). A unique identifier unambiguously denoting the query to be executed may form the information about the query. Such a unique identifier may be formed by a representation of the query itself, such as the SQL code, or may be generated by some digest function, such as MD5, so that the information about the query may be used as a key in order to retrieve the corresponding information about the value for each variable and about the preferred access path. The information about the value of each variable may be one of the group of, the value itself, a range of values, a category categorizing a range of values, a category categorizing the behavior of the optimizer, i.e., a category of values causing a table-space scan access path, a category of values causing an index-scan access path, a category of values causing an index-access access path, a category corresponding to a cardinality range of the first value belonging to or the frequency distribution of the values.

In the following, a plurality of different queries may be executed in accordance with the present invention, in particular, according to the steps illustrated by block 102 and block 104 (dotted line 106). However, if the query from the beginning is to be executed again, the method is continued (block 108). It should be noted that a query is considered to be the same query even if the values for the query variables may be different.

Now, the information previously stored and the respective information derived from the current value of each variable of the query is compared (block 110). The comparison may include the generation of the information if they need to be derived from the current variable values. Subsequently, it is determined whether or not the access path needs to be re-generated (block 114). A re-generation of the access path may be necessary, if the current, or second, value of at least one of the variables differs from the stored, or first, value of the same variable by at least a predetermined amount. Alternatively, a re-generation of the access path may be performed, if the category the first value belongs to differs from the category the second value belongs to. In other words, whenever at least one value may cause the optimizer to generate a different access path than the one stored, a re-generation is initiated. It is acknowledged that it may be implemented that a re-generation is only be initiated if more than one of the variable values have been changed.

If yes, the preferred access path is re-generated (block 116) using the current variable values before executing the query according to the newly generated access plan (block 118). In contrary, if no, i.e., it is not necessary to re-generate the access path, the stored access path to be used during execution of the query (block 118) is retrieved (block 120).

Figure 2:
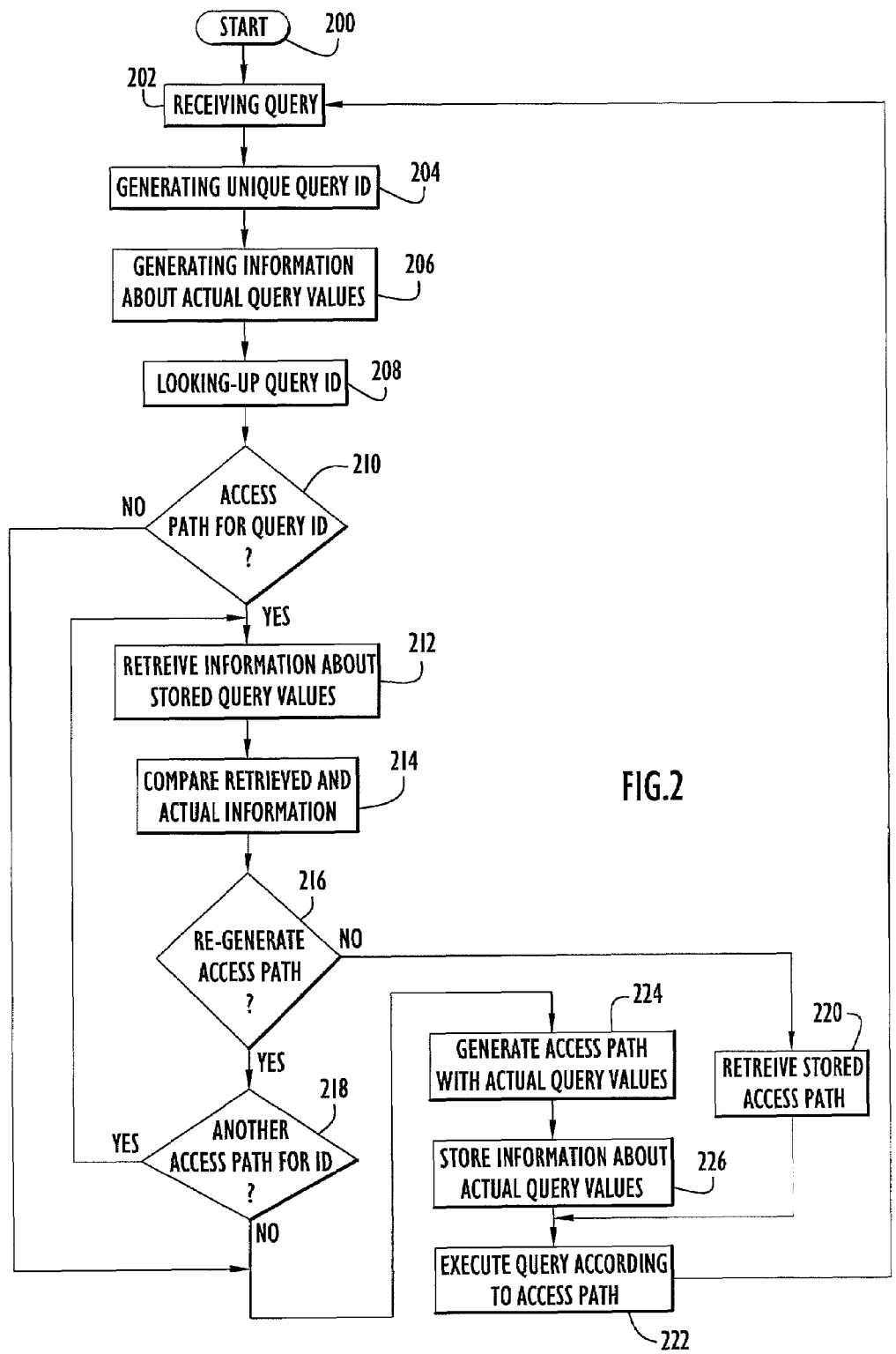
FIG. 2 shows a detailed flowchart of a first embodiment of the method in accordance with the present invention.

With reference now to FIG. 2, there is depicted a detailed flowchart of a first embodiment of the method in accordance with the present invention. After the start (block 200) a new query to be executed is awaited. In a first step, a query is received (block 202), then, a unique identification (ID) is derived from the query (block 204) as aforementioned with reference to FIG. 1.

The query includes SQL statements and variables, also referred to as "host variables". Host variables are variables referenced by embedded SQL statements. They transmit data between the database manager and an application program (cf. FIG. 3). According to the present invention, the actual values for the variables are taken into account when optimizing the query for execution. Furthermore, the question whether or not to re-optimize a query, i.e., re-generating a preferred access path, depends on the values used in the creation of an existing access path and the values in the query to be executed. In order to allow comparing different values of each variable in a query, information is generated representing the value (block 206), as explained above with reference to FIG. 1.

With the unique ID as a key, it is determined whether or not information about a query, about a preferred access path and about the value of at least one of the variables is already stored (block 208). In case an access path exists for the looked-up query ID, then, information about the stored query values are retrieved (block 212).

Then, the retrieved information previously and the corresponding information derived from the current value of each variable of the query are compared (block 214). The comparison may be performed as described with reference to FIG. 2 above.

In case a re-generation of the access path is necessary (block 216), it is checked whether or not another access path is stored under the same query ID (block 218). If yes, the method continues processing at block 212 in order to retrieve information about the query values corresponding to the other access path.

Back to block 216, alternatively, if no, i.e., if a re-generation of the access path is not necessary, be it, because the values are the same, the stored values and the current values belong to the same category or, simply, the current values would not lead to a different access path, the stored access path gets retrieved (block 220), before the query gets executed according to the access path (block 222).

Returning the focus again to block 218, alternatively, if no, i.e., if there is no other access path stored under the current query ID, then, an access path is generated taking into consideration the actual query values (block 224). Subsequently, information about the actual query values and about the generated access path is stored under the query ID for future use (block 226). Then, the query gets executed according to the access path (block 222). Thereafter, the method is continued with the initial step of receiving a query to be executed (block 202).

Figure 3:
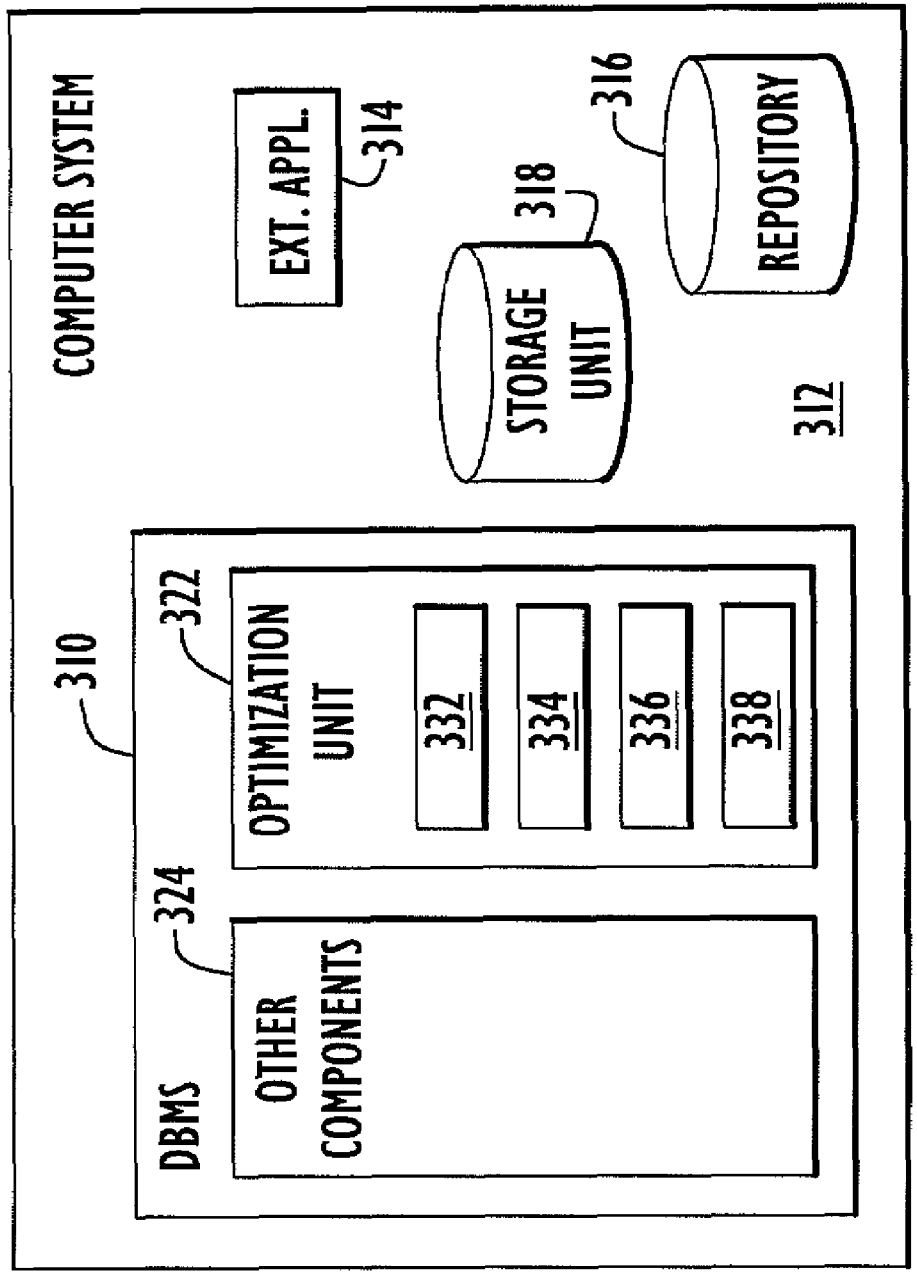
FIG. 3 shows a block diagram illustrating a database management system in a computer system in accordance with the present invention.

Now with reference to FIG. 3, there is depicted a block diagram illustrating a database management system 310 in a computer system environment 312 in accordance with the present invention.

The computer system environment 312 further includes an external application 314 that is separate from the database management system 310, a repository 316 and a storage unit 318, both for storing data. An application server, such as SAP, PeopleSoft or Siebel, may form the external application 314. The repository 316 and the storage unit 318 may be formed by non-volatile memory, such as a hard disk. It is acknowledged that the external application may be running on a different computer system that would be connected to the computer system 312 via a network. The same may apply to the repository 316 and the storage unit 318, which may be formed by one or more dedicated storage servers. Alternatively, the repository 316 could be an integral part of the storage unit 318 or vice versa.

The database management system 310 comprises an optimization unit 322 and other components 324. The other components are illustrated by one single block purely for the sake of clarity. For more details on the operation of a database management system and its components, reference is made to FIG. 1 and the respective description.

The optimization unit 322 acts as a device for processing a query in the database management system 310 that generates an access path for retrieving desired data from the computer storage 318 in response to the query. The optimization unit 322 comprises a first interface 332 for receiving a query in form of a predetermined representation, an identification unit 334 for deriving an identification from at least a portion of the representation, a second interface 336 for accessing a repository of information about the value of each variable in the query in order to find previously stored information about query values being used to create a stored access path, and a functional unit 338 being adapted to compare the information about the first value for each variable with information about the second value for the respective variable and to determine whether or not a re-generation of the preferred access path is to be performed again, when the same query is to be executed again using a second value for each variable, and if yes, for re-generating of the preferred access path.

The first interface 332 may be formed by a communication link to at least one of the other components 324, whereas the second interface 336 may be implemented by a communication link to the repository 316.

The unit 334 for deriving a unique identification from at least a portion of the representation may be formed by a functional unit, such as a computer program, for computing a hash function, such as MD5, from the respective portion of the query's representation.

In a particular embodiment, the optimization unit 322 enhances a system for the storage and retrieval of data comprising a repository for storing access path information specifying a preferred access path to be used for a particular query, whereby the repository is adapted for storing information of at least one host variable value that has been used to generate the access path information and it contains a functional entity for dynamically optimizing the database access by invoking a re-generation of the access path whenever at least one of the host variable values kept in the repository differs from the actual value by at least a predetermined value, whereby a re-generation of the preferred access path is only performed when the probability of a significant performance loss is higher than the time needed for the re-generation of the pre-defined information.

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program in the present context means any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method of processing a query in a database management system, the method comprising:
   (a) generating a preferred access path for a query with at least one variable at an initial execution of said query, wherein said preferred access path is generated based upon a first value for each variable in the query assigned during the initial execution of said query;
   (b) storing information related to said query, said first value for each variable and said preferred access path;
   (c) subsequently executing said query with a second value for each said variable assigned during the subsequent execution of said query and comparing the stored information related to said first value for each variable with information related to said second value for each variable; and
   (d) regenerating said preferred access path for said query in response to said comparison indicating that said information related to said second value assigned during said subsequent execution of said query differs sufficiently from said stored information related to said first value assigned during said initial execution of said query to enable generation of an access path different than said preferred access path.

2. The method of claim 1, wherein step (a) further includes:
   (a.1) generating a preferred access path for said query based further upon a frequency distribution of said first value for each variable in said query.

3. The method of claim 1, wherein step (b) further includes:
   (b.1) generating a unique identifier unambiguously denoting the query.

4. The method of claim 1, wherein step (b) further includes:
   (b.1) storing said first value for each variable independently.

5. The method of claim 1, wherein step (b) further includes:
   (b.1) determining a frequency distribution of said first value for each variable.

6. The method of claim 1, wherein step (b) further includes:
   (b.1) determining a unique indicator unambiguously denoting a category of values that cause the generation of the same access path.

7. The method of claim 6, wherein step (b.1) further includes:
   (b.1.1) choosing a category, wherein said category is at least one of:
   a category of values causing a table-space scan access path,
   a category of values causing an index-scan access path,
   a category of values causing an index-access access path, and
   a category corresponding to a cardinality range of said first value.

8. The method of claim 7, wherein step (c) includes:
   (c.1) categorizing said second value for each variable.

9. The method of claim 8, wherein step (c) includes:
   (c.2) determining whether said first value and said second value belong to a different category.

10. The method of claim 1, wherein step (d) includes:
    (d.1) storing the regenerated preferred access path and corresponding second values for each variable and frequency distribution.

11. A program product apparatus having a computer readable medium with computer program logic recorded thereon for processing a query in a data management system, said program product apparatus comprising:
    an optimizer module to generate a preferred access path for a query with at least one variable at an initial execution of said query, wherein said preferred access path is generated based upon a first value for each variable in the query assigned during the initial execution of said query;
    a storage module to store information related to said query, said first value for each variable and said preferred access path; and
    a functional module to compare the stored information related to said first value for each variable of said query with information related to a second value for each variable of said query assigned during a subsequent execution of said query and to regenerate said preferred access path for said query in response to said comparison indicating that said information related to said second value assigned during said subsequent execution of said query differs sufficiently from said stored information related to said first value assigned during said initial execution of said query to enable generation of an access path different than said preferred access path.

12. The program product of claim 11, wherein the optimizer module generates a preferred access path for said query based further upon a frequency distribution of said first value for each variable in said query.

13. The program product of claim 11, wherein the storage module further generates a unique identifier unambiguously denoting the query.

14. The program product of claim 11, wherein the storage module stores said first value for each variable independently.

15. The program product of claim 11, wherein the storage module determines a frequency distribution of said first value for each variable.

16. The program product of claim 11, wherein the storage module determines a unique indicator unambiguously denoting a category of values that cause the generation of the same access path.

17. The program product of claim 16, wherein the storage module further chooses a category, wherein said category is at least one of:
    a category of values causing a table-space scan access path,
    a category of values causing an index-scan access path,
    a category of values causing an index-access access path, and
    a category corresponding to a cardinality range of said first value.

18. The program product of claim 17, wherein the functional module categorizes said second value for each variable.

19. The program product of claim 18, wherein the functional module determines whether said first value and said second value belong to a different category.

20. The program product of claim 11, wherein the functional module stores the regenerated preferred access path and corresponding second values for each variable and frequency distributions in response to said preferred access path regeneration.

21. A system for the storage and retrieval of data comprising:
    an optimizer to generate a preferred access path for a query with at least one variable at an initial execution of said query, wherein said preferred access path is generated based upon a first value for each variable in the query assigned during the initial execution of said query;
    a storage unit to store information related to said query, said first value for each variable and said preferred access path; and
    a functional unit to compare the stored information related to said first value for each variable of said query with information related to a second value for each variable of said query assigned during a subsequent execution of said query and to regenerate said preferred access path for said query in response to said comparison indicating that said information related to said second value assigned during said subsequent execution of said query differs sufficiently from said stored information related to said first value assigned during said initial execution of said query to enable generation of an access path different than said preferred access path.

22. The system of claim 21, wherein the optimizer generates a preferred access path for said query based further upon a frequency distribution of said first value for each variable in said query.

23. The system of claim 21, wherein the storage unit further generates a unique identifier unambiguously denoting the query.

24. The system of claim 21, wherein the storage unit stores said first value for each variable independently.

25. The system of claim 21, wherein the storage unit determines a frequency distribution of said first value for each variable.

26. The system of claim 21, wherein the storage unit determines a unique indicator unambiguously denoting a category of values that cause the generation of the same access path.

27. The system of claim 26, wherein the storage unit further chooses a category wherein said category is at least one of:
 a category of values causing a table-space scan access path,
 a category of values causing an index-scan access path,
 a category of values causing an index-access access path, and
 a category corresponding to a cardinality range of said first value.

28. The system of claim 27, wherein the functional unit categorizes said second value for each variable.

29. The system of claim 28, wherein the functional unit determines whether said first value and said second value belong to a different category.

30. The system of claim 21, wherein the functional unit stores the regenerated preferred access path and corresponding second values for each variable and frequency distributions in response to said preferred access path regeneration.

* * * * *